(12) United States Patent
Knott (10) Patent No.: US 10,836,867 B2
(45) Date of Patent: Nov. 17, 2020

(54) COMPOSITION CONTAINING PLATINUM

(71) Applicant: Evonik Operations GmbH, Essen (DE)

(72) Inventor: Wilfried Knott, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/314,585

(22) PCT Filed: Jun. 17, 2015

(86) PCT No.: PCT/EP2015/063551
§ 371 (c)(1),
(2) Date: Nov. 29, 2016

(87) PCT Pub. No.: WO2016/005157
PCT Pub. Date: Jan. 14, 2016

(65) Prior Publication Data
US 2017/0198099 A1  Jul. 13, 2017

(30) Foreign Application Priority Data
Jul. 11, 2014 (DE) ........................ 10 2014 213 507

(51) Int. Cl.
| | | |
|---|---|---|
| *C08G 77/46* | (2006.01) | |
| *C08G 77/08* | (2006.01) | |
| *C08G 77/442* | (2006.01) | |
| *B01J 27/24* | (2006.01) | |
| *B01J 31/06* | (2006.01) | |
| *B01J 31/22* | (2006.01) | |
| *B01J 31/30* | (2006.01) | |
| *C08G 77/18* | (2006.01) | |

(52) U.S. Cl.
CPC .............. *C08G 77/08* (2013.01); *B01J 27/24* (2013.01); *B01J 31/06* (2013.01); *B01J 31/2295* (2013.01); *B01J 31/30* (2013.01); *C08G 77/18* (2013.01); *C08G 77/442* (2013.01); *C08G 77/46* (2013.01); *B01J 2231/323* (2013.01); *B01J 2531/828* (2013.01)

(58) Field of Classification Search
None
See application file for complete search history.

(56) References Cited

U.S. PATENT DOCUMENTS

| | | | |
|---|---|---|---|
| 3,775,452 A | 11/1973 | Karstedt | |
| 3,814,730 A | 6/1974 | Karstedt | |
| 4,096,159 A | 6/1978 | Hechtl et al. | |
| 4,417,068 A * | 11/1983 | Kollmeier | .............. C08G 77/38 549/214 |
| 5,158,922 A | 10/1992 | Hinney et al. | |
| 6,136,445 A | 10/2000 | Gruner et al. | |
| 6,291,622 B1 | 9/2001 | Droese et al. | |
| 6,307,802 B1 | 10/2001 | Klein et al. | |
| 6,858,663 B2 | 2/2005 | Knott et al. | |
| 7,125,585 B2 | 10/2006 | Dudzik et al. | |
| 7,157,541 B2 | 1/2007 | Knott et al. | |
| 7,612,159 B2 | 11/2009 | Burkhart et al. | |
| 7,619,035 B2 | 11/2009 | Henning et al. | |
| 7,754,778 B2 | 7/2010 | Knott et al. | |
| 7,825,206 B2 | 11/2010 | Neumann et al. | |
| 8,138,294 B2 | 3/2012 | Henning et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |

(Continued)

FOREIGN PATENT DOCUMENTS

| | | |
|---|---|---|
| CN | 1261074 A | 7/2000 |
| DE | 2646726 A1 | 4/1978 |

(Continued)

OTHER PUBLICATIONS

German language International Search Report dated Aug. 5, 2015 in PCT/EP2015/063551 (3 pages).
German language Written Opinion dated Aug. 5, 2015 in PCT/EP2015/063551 (6 pages).
International Search Report dated Aug. 5, 2015 in PCT/EP2015/063551 (2 pages).
Liao et al., "Catalytic synthesis of silicone—polyether surfactant under no solvent condition," China Surfactant Detergent & Cosmetics, Copyright Dec. 2005, vol. 35, No. 6, The School of Chemical and Energy Engineering, South China University of Technology, Guangzhou 510640, China, Chemistry Department of Nanchang University, Nanchang, 330047, China, pp. 350-352 (See English Abstract).

(Continued)

*Primary Examiner* — Yun Qian
(74) *Attorney, Agent, or Firm* — Philip P. McCann; Taylor English Duma LLP (57) ABSTRACT

The invention provides for a composition comprising elemental platinum and/or at least one platinum-containing compound, where said platinum has a positive oxidation state, and one or more organic compounds comprising carbon atoms, hydrogen atoms and at least two oxygen atoms, wherein at least one of said compounds comprises at least one olefinic unsaturation, characterized in that said composition comprises a proportion of organic compounds comprising carbon atoms, hydrogen atoms and at least two oxygen atoms of from 50.0 to 99.9 wt % and a proportion of the sum of elemental platinum and platinum-containing compounds of from 0.1 to 50.0 wt % in each case based on the composition, with the proviso that the proportions of organic compounds comprising carbon atoms, hydrogen atoms and at least two oxygen atoms and of elemental platinum and platinum-containing compounds sum to at least 90 wt % based on the composition and the proviso that the olefinic unsaturation content is at least 0.1 g of iodine/100 g of the organic compounds comprising carbon atoms, hydrogen atoms and at least two oxygen atoms, corresponding to at least 0.004 meq/g, for a process for preparing said composition and for the use thereof.

9 Claims, 1 Drawing Sheet

(56) References Cited

U.S. PATENT DOCUMENTS

| | | |
|---|---|---|
| 8,309,664 B2 | 11/2012 | Knott et al. |
| 8,334,355 B2 | 12/2012 | Henning et al. |
| 8,349,907 B2 | 1/2013 | Henning et al. |
| 8,420,748 B2 | 4/2013 | Henning et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,623,984 B2 | 1/2014 | Henning et al. |
| 8,722,836 B2 | 5/2014 | Knott et al. |
| 8,729,207 B2 | 5/2014 | Hartung et al. |
| 8,772,423 B2 | 7/2014 | De Gans et al. |
| 8,779,079 B2 | 7/2014 | Henning et al. |
| 8,802,744 B2 | 8/2014 | Knott et al. |
| 8,841,400 B2 | 9/2014 | Henning et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 2002/0161158 A1 | 10/2002 | Burkhart et al. |
| 2007/0128143 A1 | 6/2007 | Gruning et al. |
| 2010/0022435 A1 | 1/2010 | Henning et al. |
| 2011/0230619 A1 | 9/2011 | Kuppert et al. |
| 2011/0301254 A1 | 12/2011 | Knott et al. |
| 2012/0068110 A1 | 3/2012 | Schubert et al. |
| 2012/0282210 A1 | 11/2012 | Henning et al. |
| 2013/0041115 A1 | 2/2013 | Knott et al. |
| 2013/0213267 A1 | 8/2013 | Fiedel et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2015/0023900 A1 | 1/2015 | Knott et al. |
| 2015/0080593 A1 | 3/2015 | Henning et al. |
| 2016/0053051 A1 | 2/2016 | Schubert et al. |
| 2016/0130290 A1 | 5/2016 | Knott et al. |
| 2016/0130402 A1 | 5/2016 | Schubert et al. |

FOREIGN PATENT DOCUMENTS

| | | | |
|---|---|---|---|
| DE | 3133869 C1 | | 5/1983 |
| EP | 0075703 A1 | | 4/1983 |
| EP | 0654302 A1 | | 5/1995 |
| EP | 0754740 A2 | | 1/1997 |
| EP | 0995771 | * | 4/2000 |
| EP | 1013701 A2 | | 6/2000 |
| EP | 1031603 A2 | | 8/2000 |
| EP | 1520870 A1 | | 4/2005 |
| EP | 1754740 A2 | | 2/2007 |
| WO | 98/00463 A1 | | 1/1998 |
| WO | 02/068506 A1 | | 9/2002 |
| WO | 2013/010747 A1 | | 1/2013 |
| WO | 2015/176920 A1 | | 11/2015 |
| WO | 2015/176921 A1 | | 11/2015 |
| WO | 2016/120023 A1 | | 8/2016 |

OTHER PUBLICATIONS

Zhang et al., Chinese Master's Theses Full-text Database Engineering Science and Technology I, South China University of Technology, pp. 36-42.

* cited by examiner

COMPOSITION CONTAINING PLATINUM

This application is a national stage application under 35 U.S.C. § 371 of International Application No. PCT/EP2015/063551 filed 17 Jun. 2015, which claims priority to German Application No. 10 2014 213 507.9 filed 11 Jul. 2014, the disclosures of which are expressly incorporated herein by reference.

FIELD

The invention relates to a composition comprising elemental platinum and/or at least one platinum-containing compound, where said platinum has a positive oxidation state, and one or more organic compounds comprising carbon atoms, hydrogen atoms and at least two oxygen atoms, wherein at least one of said compounds comprises at least one olefinic unsaturation, characterized in that said composition comprises a proportion of organic compounds comprising carbon atoms, hydrogen atoms and at least two oxygen atoms of from 50.0 to 99.9 wt % and a proportion of the sum of elemental platinum and platinum-containing compounds of from 0.1 to 50.0 wt % in each case based on the composition, with the proviso that the proportions of organic compounds comprising carbon atoms, hydrogen atoms and at least two oxygen atoms and of elemental platinum and platinum-containing compounds sum to at least 90 wt % based on the composition and the proviso that the olefinic unsaturation content is at least 0.1 g of iodine/100 g of the organic compounds comprising carbon atoms, hydrogen atoms and at least two oxygen atoms, corresponding to at least 0.004 meq/g, to a process for preparing said composition and to the use thereof.

BACKGROUND

SiC-bonded organomodified siloxanes, expecially polyether siloxanes, are an industrially very important substance class given their widely adjustable surfactant properties. The established route to preparing these substances is the platinum-metal-catalysed addition of siloxanes and silanes bearing SiH groups onto olefinically functionalized compounds, for example onto allyl polyethers.

The use of platinum catalysts for the addition of silanes or siloxanes comprising SiH groups onto compounds comprising one or more olefinic double bonds is known (hydrosilylation) and is described in "Chemie and Technologie der Silicone", Verlag Chemie, 1960, page 43, and in the patent literature, for example in DE-A-26 46 726, EP-A-0 075 703 and U.S. Pat. No. 3,775,452. It is predominantly hexachloroplatinic acid and cis-diamminedichloroplatinum(II) that have become established in current industrial practice.

Platinum catalysts often employed in the more recent past are Karstedt-type catalysts (U.S. Pat. No. 3,814,730). These are prone to deactivation and shut-down phenomena when employed in the preparation of organomodified siloxanes, in particular allyl polyether siloxanes, and the addition reaction thus often requires postcatalysis and/or even drastic increases in temperature.

WO-A-98/00463 describes defined solid compounds having high decomposition temperatures (144.3° C. and 138.4° C.) which by addition of selected electron-poor olefins to a Karstedt catalyst are said to provide an active and simultaneously stable catalyst system for homogeneous hydrosilylation. The enhanced activity is attributed to the introduction of strongly π-acidic ligands, such as, in particular, methylnaphthoquinone and tetraethyltetracarboxylatoethylene. The reported examples comprise adding triethylsilane onto vinyltrimethylsilane, a 100% excess of the olefin component being employed. Despite the large excess and taking into account that the vinyl group, in contrast to the allyl group, is not isomerization-active, at 50° C. this catalysis shuts down due to deactivation after 2 hours to achieve a SiH conversion of only 68%. At 73° C., this catalyst system decomposes immediately giving a SiH conversion of only 18% (P Steffanut et al., Chem. Eur. J. 1998, 4, no. 10, page 2014).

EP 1 520 870 describes a catalyst which overcomes several of the cited problems. The catalyst is prepared by admixing platinum$^{(0)}$ complex catalyst solutions, in particular those based on commercially available Karstedt complexes, with efficacious amounts of activating $C_{2-6}$ olefins before adding these to the hydrosilylation matrix and then carrying out the hydrosilylation at moderate temperatures, preferably at between about 20° C. and about 150° C.

However, the use of platinum catalysts or the preparation thereof often involves the use of pulverulent platinum-containing substances. The handling of such pulverulent substances, which are often also toxic, causes problems because of dusting and because of metering which is awkward and imprecise due to dust losses.

Depending on the particle size distribution of the pulverulent platinum-containing substances of relatively high oxidation state, SiC bond forming reactions, particularly in silicone polyether systems suffer the additional problem of excessive platinum concentration at the catalyst introduction point of the hydrosilylation reactor (local overconcentration) which causes undesired platinum precipitation and gel formation.

The problem addressed by the present invention is consequently that of providing a platinum catalyst or a platinum catalyst system which overcomes one or more of the above-mentioned problems.

SUMMARY

It was found that, surprisingly, this problem is solved by the compositions described in more detail in the claims and in the description which follows.

The present invention thus provides for compositions comprising elemental platinum and/or at least one platinum-containing compound, where said platinum has a positive oxidation state, and one or more organic compounds comprising carbon atoms, hydrogen atoms and at least two oxygen atoms (referred to hereinbelow as OHC compounds), wherein at least one of said compounds comprises at least one olefinic unsaturation, characterized in that said compositions comprise a proportion of organic compounds comprising carbon atoms, hydrogen atoms and at least two oxygen atoms of from 50.0 to 99.9 wt % and a proportion of the sum of elemental platinum and platinum-containing compounds of from 0.1 to 50.0 wt % in each case based on the composition, with the proviso that the proportions of organic compounds comprising carbon atoms, hydrogen atoms and at least two oxygen atoms and of elemental platinum and platinum-containing compounds sum to at least 90 wt % based on the composition and the proviso that the olefinic unsaturation content is at least 0.1 g of iodine/100 g of the organic compounds comprising carbon atoms, hydrogen atoms and at least two oxygen atoms, corresponding to at least 0.004 meq/g.

The present invention likewise provides for a process for preparing the composition according to the invention, characterized in that one or more organic compounds comprising carbon atoms, hydrogen atoms and at least two oxygen atoms, wherein at least one of said compounds comprises an olefinic unsaturation, and having an olefinic unsaturation content of at least 0.1 g of iodine/100 g of the organic compounds comprising carbon atoms, hydrogen atoms and at least two oxygen atoms, corresponding to at least 0.004 meq/g, are initially charged into a vessel fitted with a stirrer, preferably a dispersing disc, and pulverulent platinum and/or one or more pulverulent, platinum-containing compounds is/are added with stirring, wherein the amount of pulverulent platinum and/or one or more pulverulent, platinum-containing compounds used is chosen such that the composition comprises a proportion of organic compounds comprising carbon atoms, hydrogen atoms and at least two oxygen atoms of from 50.0 to 99.9 wt % and a proportion of the sum of elemental platinum and platinum-containing compounds of from 0.1 to 50.0 wt % in each case based on the composition.

The present invention further provides for the use of the composition according to the invention as catalyst in a process where compounds comprising H—Si groups are reacted with compounds comprising olefinic double bonds.

The compositions according to the invention have the advantage that they permit dust-free storage and metering of the often toxic and/or carcinogenic catalyst.

Addition of the catalyst in the form of the composition according to the invention has the additional advantage that it permits more precise metering of the catalyst to the reaction mixture since the build up of dusty deposits on pipes or the like is prevented.

These advantages are preferably achieved without any detectable reduction in the activity of the catalyst.

DETAILED DESCRIPTION

The composition according to the invention has the further advantage that the composition is storage-stable over a relatively long period of time. Compositions according to the invention were thus able to be stored in darkness for 3 months at 22° C. without any detectable reduction in catalyst activity. In the context of the present teaching, the term storage stability is to be understood as meaning the lack of any tendency of the inventive compositions towards platinum precipitation and not, for example, the sedimentation of solid particles or else the crystallization of salts.

It has been found that in order to obtain storage-stable preparations, particularly when using di-µ-chlorobis[chloro(cyclohexene)platinum(II)] (Pt 92), it is a requirement that the compound comprising at least two oxygen atoms (OHC compound) also has a measurable olefinic unsaturation content. For instance, when di-µ-chlorobis[chloro(cyclohexene)platinum(II)] (Pt 92) preparations comprising 0.55 wt % of platinum are stored in fully saturated OHC compounds, for example in ethylene glycol, 1,2-dimethoxyethane or butyl diglycol, said preparations are prone to forming brown/black platinum precipitates after just 2 to 3 days of storage in darkness at 22° C.

By contrast, when preparations of di-µ-chlorobis[chloro(cyclohexene)platinum(II)] (Pt 92) in allyl-alcohol-started, methyl-etherified polyetherols having an average molecular weight of 1400 g/mol and comprising in their polymer backbone ethylene oxide/propylene oxide proportions (EO/PO) of 42/58 or 12/88 are left to stand in darkness at 22° C., they are prone, without decomposition, to crystallization of the platinum complex which in each case is deposited as coarse crystals at the bottom of the storage vessel.

Preparing a di-µ-chlorobis[chloro(cyclohexene)platinum(II)] (Pt 92) preparation comprising 0.55 wt % of platinum using, for example, an allyl-alcohol-started, hydroxyfunctional polyetherol having an average molecular weight of 800 g/mol and comprising in its polymer backbone ethylene oxide/propylene oxide weight fractions (EO/PO) of 74/26 affords a storage-stable system which, after 12 weeks of storage in darkness at 22° C., exhibits neither a tendency towards platinum precipitation nor a tendency towards crystallization of the type described previously.

Depending on the platinum compound employed, the use of the composition according to the invention can moreover enhance activity, apparent from a relatively early clearing point and measurable as SiH conversion as a function of time, in hydrosilylation reactions compared to customary pulverulent catalysts.

Employing the inventive preparations comprising platinum compounds of relatively high oxidation state is advantageous for the quality of the desired SiC bond forming products, in particular of the polyether siloxanes, which are used as polyurethane foam stabilizers or as coatings additives for example, since the use of said preparations in batch processes avoids local overconcentrations of platinum at the introduction point of the hydrosilylation reactor, said overconcentrations being the cause of undesired platinum precipitation and of gel formation.

The compositions according to the invention, a process for the preparation thereof and the use of the composition are described by way of example hereinbelow without any intention to restrict the invention to these exemplary embodiments. When ranges, general formulae or compound classes are specified hereinbelow, these shall include not just the corresponding ranges or groups of compounds that are explicitly mentioned but also all sub-ranges and sub-groups of compounds which can be obtained by extracting individual values (ranges) or compounds. Where documents are cited in the context of the present description, the content thereof shall fully form part of the disclosure content of the present invention particularly in respect of the substantive matter in the context for which the document was cited. Percentages referred to hereinbelow are by weight unless otherwise stated. Averages referred to hereinbelow are number averages unless otherwise stated. Where properties of a material are referred to hereinbelow, for example viscosities or the like, these are properties of the material at 25° C. unless otherwise stated. When chemical (empirical) formulae are used in the present invention, the reported indices can be not only absolute numbers but also averages. Indices relating to polymeric compounds are preferably averages.

Where reference is made to substances existing as powders or pulverulent substances, this is to be understood as meaning substances existing as a mixture of particles. It is preferable when the pulverulent mixtures comprise particles having an average particle size R within the range $0.01 \text{ mm} < R < 0.1 \text{ mm}$. The proportions of particles having diameters $R \geq 20$ µm can, for example, be determined by sieve analysis according to DIN 66165-1 the procedure of which is performed as per DIN 66165-2. The most commonly used sieve analysis process is dry sieving such as may be carried out in a Retsch AS200 tap laboratory sieving machine for example.

The grain size distribution in powders comprising proportions of particles having diameters R of less than 20 µm and even down to the nanometre scale $\geq 0.01$ µm may be determined, for example, by laser diffraction where particle size distributions are determined by measuring the angle-dependence of the intensity of scattered light from a laser beam penetrating a dispersed particle sample. The Mastersizer 3000 particle size analyzer from Malvern Instruments, England, for example, is based on this principle of measurement and covers a particle size range of from 0.01 μm to 3500 μm.

The inventive composition comprising elemental platinum and/or at least one platinum-containing compound, where said platinum has a positive oxidation state, and one or more organic compounds comprising carbon atoms, hydrogen atoms and at least two oxygen atoms, wherein at least one of said compounds comprises at least one olefinic unsaturation, is characterized in that said composition comprises a proportion of organic compounds comprising carbon atoms, hydrogen atoms and at least two oxygen atoms of from 50.0 to 99.9 wt %, preferably from 75 to 99.8 wt %, preferably from 90 to 99.7 wt % and more preferably from 99.0 to 99.7 wt % and a proportion of the sum of elemental platinum and platinum-containing compounds of from 0.1 to 50.0 wt %, preferably from 0.2 to 25 wt %, preferably from 0.3 to 10 wt % and more preferably from 0.3 to 1.0 wt % in each case based on the composition, with the proviso that the proportions of organic compounds comprising carbon atoms, hydrogen atoms and at least two oxygen atoms (OHC compounds) and of elemental platinum and platinum-containing compounds sum to at least 90 wt %, preferably 95 wt %, more preferably 99 wt % and most preferably 100 wt % based on the composition and the proviso that the olefinic unsaturation content is at least 0.1 g of iodine/100 g of the organic compounds comprising carbon atoms, hydrogen atoms and at least two oxygen atoms (OHC compounds), corresponding to at least 0.004 meq/g.

The composition according to the invention preferably comprises a platinum(II) compound as platinum-containing compound having a positive oxidation state. It is preferable when the composition according to the invention comprises cis-$(NH_3)_2PtCl_2$ and/or di-μ-chlorobis[chloro(cyclohexene)platinum(II)] (Pt 92) as platinum-containing compound(s) having a positive oxidation state. It is particularly preferable when the proportion of cis-$(NH_3)_2PtCl_2$ is more than 95 mol %, preferably more than 99.5 mol %, based on the total content of platinum in the composition.

Preferred compositions according to the invention are those comprising less than 5 mol %, preferably less than 0.5 mol %, of elemental platinum based on the total amount of platinum. Particular preference is given to compositions according to the invention comprising no detectable amounts of elemental platinum and/or platinum (0) (complex) compounds.

It is preferable when the composition according to the invention comprises, as OHC compounds, those conforming to formula (I):

(I)

where

A is either hydrogen or an at least one carbon atom-comprising saturated or unsaturated organic radical, preferably an at least one carbon atom-comprising organic radical of an organic starter compound for preparing the compound, R is independently for each occurrence a saturated 2-18 carbon atom-comprising alkyl group or an aromatic radical, preferably an ethyl group or a phenyl radical respectively, Z is either hydrogen,
 a linear or branched, saturated or unsaturated 1-18 carbon atom-comprising hydrocarbon radical, preferably a methyl, ethyl, propyl, butyl, vinyl, allyl group, or the radical of an organic acid of formula —C(=O)—$Z_E$, where $Z_E$ is an organic radical, preferably a linear or branched, saturated or olefinically unsaturated 1 to 17 carbon atom-comprising hydrocarbon radical, preferably a methyl group, or an aromatic 6 to 20 carbon atom-comprising hydrocarbon radical, preferably a phenyl radical, or the radical of formula —C(=O)—O—$Z_C$, where $Z_C$ is an organic radical, preferably a linear or branched, saturated or olefinically unsaturated 1 to 18 carbon atom-comprising hydrocarbon radical, preferably a methyl group, ethyl group, or an aromatic 6 to 20 carbon atom-comprising hydrocarbon radical, preferably a phenyl radical, m is from 0 to 50, preferably from 0 to 30, more preferably from 0 to 20, n is from 0 to 250, preferably from 3 to 220, more preferably 5 to 200, o is from 0 to 250, preferably from 3 to 220, more preferably from 5 to 200, a is from 1 to 8, preferably from greater than 1 to 6, more preferably 1, 2, 3 or 4, with the proviso that m, n and o sum to no less than 1 and the olefinic unsaturation content is at least 0.1 g of iodine/100 g of OHC compound, corresponding to at least 0.004 meq/g.

It is preferable to use OHC compounds comprising exclusively hydrogen atoms, oxygen atoms and carbon atoms.

The composition according to the invention preferably comprises, as organic compound(s) comprising carbon atoms, hydrogen atoms and at least two oxygen atoms, which compounds further comprise an olefinic unsaturation (unsaturated OHC compound(s)), compounds of formula (I) where A and/or Z comprise an olefinically unsaturated radical.

Preferred unsaturated OHC compounds of formula (I) are unsaturated polyethers, i.e., compounds of formula (I) where m, n and o sum to no less than 3 and also allyloxyethanol and vinylhdroxybutanol. The compositions according to the invention comprise, in particular, allyloxyethanol, vinylhydroxybutanol, and/or an allyl alcohol-started polyether as unsaturated OHC compounds. The unsaturated OHC compounds may be present as a mixture with saturated OHC compounds, for example as a mixture with a butanol-started polyether.

The index values recited here and the value ranges of the indices indicated can be understood as averages (weight averages) of the possible statistical distribution of the structures actually present and/or the mixtures thereof. This is also true for the structural formulae which on the face of it have been reproduced in exact terms, for example for formulae (I) and (II).

The units labelled m, n, and o can either be statistically mixed or else can form a blockwise arrangement in the chain. Statistical distributions can have a blockwise structure with any number of blocks and any sequence or can be subject to a random distribution, they can also have an alternating structure or else form a gradient along the chain, in particular they can also form any hybrid thereof where groups of different distributions may optionally follow one another. The statistical distributions can be subject to restrictions resulting from specific embodiments. Wherever the restriction does not apply, there is no change to the statistical distribution.

In the context of the present invention, radical A is to be understood as meaning radicals of substances forming the start of the OHC compound to be prepared which is obtained by addition of alkylene oxides. The starter compound is preferably selected from the group consisting of alcohols, polyetherols and phenols. It is preferable to employ a mono- or polyfunctional polyether alcohol and/or mono- or polyfunctional alcohol or any mixtures thereof as starter compound comprising the group A. In the case where a plurality of starter compounds A were employed as a mixture, the index a may also be subject to a statistical distribution. Z may moreover be the radical of a starter compound Z—OH.

Preference is given to using ethylene oxide, propylene oxide, butylene oxide and/or styrene oxide and also any mixtures of these epoxides as monomers in the alkoxylation reaction. The different monomers may be used in pure form or as a mixture. It is also possible to continuously meter over time a further epoxide to an epoxide already present in the reaction mixture, an increasing concentration gradient of the continuously added epoxide thus being formed. The polyoxyalkylenes formed are thus subject to a statistical distribution in the end product, restrictions being determinable via the metering. In the presently cited case of continuous addition of a further epoxide to an epoxide already present in the reaction mixture, a structure gradient along the length of the chain is then expected. The correlations between metering and product structure are known to those skilled in the art.

It is particularly preferable when the OHC compounds of formula (I) have a weight average molar mass of from 76 to 10 000 g/mol, preferably from 100 to 8000 g/mol and more preferably from 200 to 6000 g/mol.

It is preferable when the radicals A in the compounds of formula (I) are derived from compounds of formula (II):

$$A[\text{—OH}]_a \tag{II}$$

where, as indicated hereinabove, a is selected from the range of from 1 to 8, preferably from 1 to 6, more preferably 1, 2, 3 or 4.

Preferred radicals A derive from compounds selected from the group consisting of mono- and polyfunctional monomeric, oligomeric and polymeric alcohols, phenols, carbohydrates and carbohydrate derivatives, it being possible for the composition to comprise mixtures of compounds of formula (I) comprising different radicals A and/or Z.

It is possible to use as starter compound for the alkoxylation reaction any compounds of formula (II)

$$A[\text{—OH}]_a. \tag{II}$$

The compounds of formula (II) comprise at least one hydroxyl group and A=hydrogen or organic radical (as defined above). The organic radical comprises at least one carbon atom. In the context of the present invention, starter compounds is to be understood as meaning substances forming the beginning (start) of the OHC compound to be prepared which is obtained by addition of alkylene oxides. The starter compound is preferably selected from the group consisting of alcohols, polyetherols and phenols. It is preferable to employ a mono- or polyfunctional polyether alcohol and/or mono- or polyfunctional alcohol or any mixtures thereof as starter compound comprising the group A.

As well as aliphatic and cycloaliphatic compounds comprising OH-groups, suitable compounds of formula (II) also include any compounds comprising from 1 to 8 phenolic OH functions. These include, for example, phenol, alkyl- and arylphenols, bisphenol A and novolacs.

Particularly preferred alcohols are, for example, allyl alcohol, butanol, 1-hexenol, octanol, dodecanol, stearyl alcohol, vinyloxybutanol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol or hydroxyl group-bearing compounds based on natural products.

In the context of the present invention, the term unsaturated OHC compounds encompasses a wide variety of compounds, not only unsaturated polyethers, unsaturated polyetherols, unsaturated polyether alcohols, unsaturated polyether esters but also unsaturated polyether carbonates, which may be used interchangeably. The term "poly" is not necessarily to be understood as meaning that there are a multiplicity of ether functionalities or alcohol functionalities in the molecule or polymer. It is rather merely used to indicate that at least repeating units of individual monomeric building blocks or else compositions of relatively high molar mass are present, which additionally exhibit a certain polydispersity. For the purposes of the present invention, the word fragment "poly" encompasses not only exclusively compounds comprising at least 3 repeating units of one or more monomers in the molecule but, in particular, also compositions of compounds having a molecular weight distribution and an average molecular weight of at least 200 g/mol. This definition takes account of the fact that it is customary in the field of industry in question to refer to such compounds as polymers even if they do not appear to conform to a polymer definition as per OECD or REACH guidelines.

The unsaturated OHC compounds are preferably ethylene oxide derivatives and propylene oxide derivatives of the cited unsaturated alcohols and encompasss not only the homopolymer structures derived from only ethylene oxide (EO) or only propylene oxide (PO) but also all obtainable EO/PO mixed derivatives.

OHC compounds, in particular saturated OHC compounds, are preferably prepared using, as starter compounds, low molecular weight polyetherols comprising from 1 to 8 hydroxyl groups and having weight average molar masses of from 100 to 5000 g/mol. Particularly suitable are polypropylene glycols, polyethylene glycols, poly(ethylene-co-propylene) glycols, polybutylene glycols, poly(propylene-co-butylene) glycols, poly(butylene-co-ethylene) glycols, comprising at least one OH group. Of these polyalkylene glycols, advantageous compounds include, in particular, those deriving from butanol, allyl alcohol, 1-hexenol, vinyloxybutanol, octanol, decanol, dodecanol, butanediol, hexanediol, glycerol.

In the context of the present invention, it is possible to use a multiplicity of OHC compounds as dispersion medium either alone or preferably as a blend. Particularly preferred as olefinically unsaturated OHC compound are allyl alcohol-started polyetherols and/or alkyl-etherified allyl polyetherols and the respective mixtures thereof with butyl ethers comprising propylene oxide.

Particular preference is given to olefinically unsaturated OHC compounds where A is the a-valent radical of an organic compound having a molar mass of from 41 to 5000 g/mol, in particular from 41 to 4000 g/mol. When the radicals A are polymeric, the preferred molar masses are to be understood as meaning weight-average molar masses. The molar mass of the saturated and olefinically unsaturated OHC compounds may be determined by GPC using a polypropylene glycol standard such as is marketed by PSF in Mainz.

Only a strikingly low concentration of olefinic unsaturation in the OHC compound or the OHC compound mixture used as dispersion medium is required to render the catalyst active. In this connection, the olefinic unsaturation content is at least 0.1 g of iodine/100 g of the OHC compound or the OHC compound mixture, corresponding to at least 0.004 meq/g.

Compounds suitable as unsaturated OHC compound for preparing the composition according to the invention include all polyethers or polyether mixtures having an olefinic unsaturation, determinable iodometrically or alternatively by quantitative $^1$H NMR spectroscopy, of at least 0.1 g of iodine/100 g of polyether, corresponding to at least 0.004 meq/g.

An example of a suitable method of determining the content of olefinically unsaturated polyoxyalkylene compounds is the Hanus method for iodine number determination which is familiar to those skilled in the art, known as method DGF C-V 11 a (53) of the German Society of Fat Science. The iodine number according to DGF C-V 11 a (53) indicates the concentration of double bonds in a defined weight quantity of a substance.

Also useful, particularly for determining small yet invention-relevant contents of aliphatic unsaturated groups in the polyoxyalkylene compounds, is ASTM test method D-2849-69.

Quantitative $^1$H NMR spectroscopy proves particularly suitable for precise determination of very small contents of olefinically unsaturated groups in polyoxyalkylenes, particularly when an internal standard is added to the sample to be analysed. High-resolution NMR instruments can be used to quantitatively determine the proportions of the olefinically unsaturated groups present in the sample and accordingly to report said proportions as the iodine number equivalent.

Inventive compounds of formula (I) comprising C—C double bonds such as allyl or 1-hexenyl groups offer a route to SiC-bonded polyether siloxane copolymers by addition of siloxanes comprising SiH groups onto unsaturated polyethers. The large number of documents relating to such known polyethers includes EP 1 520 870, EP 0 075 703, U.S. Pat. No. 3,775,452 and EP 1 031 603.

Suitable processes utilize, for example, basic catalysts, for example alkali metal hydroxides and alkali metal methoxides. The use of KOH is particularly widespread and has been known for many years. Such processes typically comprise reacting a hydroxy-functional starter, generally of low molecular weight, i.e., below 200 g/mol, such as butanol, allyl alcohol, propylene glycol or glycerol with an alkylene oxide such as ethylene oxide, propylene oxide, butylene oxide or a mixture of different alkylene oxides in the presence of the alkaline catalyst to afford a polyoxyalkylene polyether. The strongly alkaline reaction conditions in this so-called living polymerization promote various side reactions.

If it is assumed that every allyl-started polyether chain comprises only one double bond, then the iodine number can be used to calculate the average molecular weight of the polyether. When the proportion of unsaturated by-products in the polyether increases, the iodine number likewise increases. Particularly when allyl alcohol is used as starter alcohol, the alkoxylation reaction carried out under alkaline catalysis also produces propenyl polyether.

It is also preferable in accordance with the invention to employ polyethers prepared by double metal cyanide catalysis. Polyethers prepared by double metal cyanide catalysis generally have a particularly low content of unsaturated end groups of no more than 0.02 milliequivalents per gram of OHC compound (meq/g), preferably no more than 0.015 meq/g, more preferably no more than 0.01 meq/g (test method ASTM D2849-69), comprise distinctly fewer monools and generally have a low polydispersity of less than 1.5. The polydispersity (PD) may be determined by a method known per se to those skilled in the art by determining by gel permeation chromatography (GPC) both the number-average molecular weight (Mn) and the weight-average molecular weight (Mw). The polydispersity is defined by PD=Mw/Mn. Such polyethers are described in U.S. Pat. No. 5,158,922 and EP-A 0 654 302 for example.

Irrespective of the preparative route, unsaturated polyoxyalkylene compounds of formula (I) preferably having a polydispersity Mw/Mn of from 1.0 to 1.5, preferably from 1.0 to 1.3, are preferentially suitable.

The amount of unsaturated OHC compounds for preparing the (hydrosilylation catalyst) composition according to the invention may be varied within wide limits. The composition according to the invention preferably comprises as unsaturated OHC compounds, in particular as unsaturated polyethers, those started with allyl alcohol or it comprises mixtures thereof or else mixtures of unsaturated polyethers with, for example, butanol-started polyethers. It is preferable when the preparation according to the invention is prepared using allyloxyethanol, vinylhydroxybutanol or polyethers selected from unsaturated polyoxyalkylene compounds taking part in the intended SiC bond forming reaction.

It is particularly preferable when the composition according to the invention is prepared by dispersing, by introduction of stirring and/or shearing energy, the particular platinum complex or mixture thereof in some and/or all of one and/or more unsaturated polyoxyalkylene compound(s) provided as component of the hydrosilylation formulation before the (catalyst) composition thus prepared in accordance with the invention is introduced into the reaction matrix to initiate the SiC bond forming reaction.

The proportion of unsaturated OHC compounds, in particular of unsaturated polyethers, in the composition according to the invention is particularly preferably from 75 to 99.8 wt % and most preferably from 99.0 to 99.7 wt % and the proportion of the sum of elemental platinum and/or platinum-containing compounds is particularly preferably from 0.2 to 25 wt % and most preferably from 0.3 to 1 wt % in each case based on the composition.

The components in the composition according to the invention are preferably homogeneously distributed. The composition may, for example, take the form of a solution, suspension, dispersion or paste or else it may consist of mixtures of these phases.

The composition according to the invention is obtainable in a very wide variety of ways. The composition according to the invention is preferably obtained via a process for preparing a composition according to the invention which is characterized in that one or more organic compounds comprising carbon atoms, hydrogen atoms and at least two oxygen atoms, wherein at least one of said compounds comprises an olefinic unsaturation and the olefinic unsaturation content is at least 0.1 g of iodine/100 g of organic compounds comprising carbon atoms, hydrogen atoms and at least two oxygen atoms, corresponding to 0.004 meq/g, are initially charged into a vessel fitted with a stirrer, preferably a dispersing disc, and pulverulent platinum and/or one or more pulverulent, platinum-containing compounds is/are added with stirring, wherein the amount of pulverulent platinum and/or one or more pulverulent, platinum-containing compounds used is chosen such that the composition comprises a proportion of organic compounds comprising carbon atoms, hydrogen atoms and at least two oxygen atoms of from 50.0 to 99.9 wt %, preferably from 75 to 99.8 wt %, preferably from 90 to 99.7 wt % and more preferably from 99.0 to 99.7 wt % and a proportion of the sum of elemental platinum and platinum-containing compounds of from 0.1 to 50.0 wt %, preferably from 0.2 to 25 wt %, preferably from 0.3 to 10 wt % and more preferably from 0.3 to 1.0 wt % in each case based on the composition.

It is preferable when one or more platinum(II) compounds are used as pulverulent platinum-containing compounds. It is preferable when cis-$(NH_3)_2PtCl_2$ and/or di-µ-chlorobis[chloro(cyclohexene)platinum(II)] (Pt92) is/are used as pulverulent platinum-containing compound(s) in the process according to the invention.

Suitable OHC compounds for preparing the catalyst preparations according to the invention include, for example, allyloxyethanol, vinylhydroxybutanol and unsaturated polyethers (e.g. allyl alcohol-started polyethers). It is possible to employ as unsaturated OHC compounds, in particular polyethers, both those that are hydroxyfunctional and those whose OH function has been etherified with, for example, a methyl group. The unsaturated OHC compounds employed may advantageously also be used in blends with saturated OHC compounds, for example butanol-started polyethers, for preparing the compositions according to the invention. The same also goes for the preferably employed, according to the teaching of the invention, ethylene oxide derived and propylene oxide derived polyoxyalkylene compounds in terms of their individual EO/PO ratio.

Useful here are, for example, a butanol-started polyetherol prepared under alkaline catalysis and exhibiting an EO/PO mass ratio of 10/90, a molar mass of about 2000 daltons and an olefinic unsaturation value determined by $^1$H NMR of 0.04 meq/g, as well as an allyl alcohol-started methyl-end-capped polyether of about 1400 daltons having an EO/PO mass ratio of 12/88.

It can moreover be advantageous to choose, for the preparation of the composition, an OHC compound(s), in particular a polyether, whose melting point or melting range exceeds the average temperature prevailing in the production zone. The compositions according to the invention can be mixed-phase systems which can be homogenized using, for example, stirring means or, generally, by introduction of shearing, dispersing energy at temperatures exceeding the melting range of the OHC compound/the polyether. Controlled cooling-down of the (catalyst) compositions homogenized in this way makes it possible to obtain an at relatively low temperatures uniformly noble metal complex-interspersed matrix which may be used as catalyst immediately or else only after several weeks of storage, preferably more than 3 weeks of storage, at relatively low temperatures, preferably temperatures of below 20° C., preferably below 18° C., without chemical decomposition reactions and concomitant loss of activity being observed.

However, in view of the relatively small amounts of noble metal, there is no significant effort involved in effecting an alternative continuous production regime of always keeping available, in a suitable, optionally temperature-controlled vessel, with continuous input of a small amount of stirring energy, a catalyst preparation which is ready for use, aliquots of which may be removed as required for the catalysis of production batches. In this way, the previously described crystallization processes that may be observable in some preparations can be countered effectively.

The loading of the olefinically unsaturated OHC compound phase, in particular polyether phase, with cis-diamminedichloroplatinum or di-µ-chlorobis[chloro(cyclohexene)platinum(II)] (Pt 92) is variable within wide ranges and can be determined for the system in question using simple bench experiments. For instance, 20% by mass of the cis-diamminedichloroplatinum complex can readily be incorporated into a butanol-started polyether obtained by alkaline catalysis and exhibiting a molecular weight of 2000 daltons, an EO/PO mass ratio of 10/90 and olefinic unsaturation (Example 5).

The addition of the pulverulent platinum and/or the pulverulent platinum-containing compound(s) of positive oxidation state is preferably effected by washing these into the vessel with the olefinically unsaturated OHC compound(s) or with the liquid composition present in the vessel.

The addition of the pulverulent platinum and/or the pulverulent platinum-containing compound is preferably effected at a temperature in the vessel of from 30° C. to 75° C., preferably from 35° C. to 50° C.

It can be advantageous when the vessel employed in the process according to the invention is a spherical vessel fitted with a lateral port by means of which the pulverulent platinum and/or the pulverulent platinum-containing compound may be added. The vessel preferably comprises a lateral port with a rotatable connection with which a container containing the pulverulent platinum and/or the pulverulent platinum-containing compound can be connected and, for emptying, rotated such that the contents can feed into the vessel under gravity. In this way, emission into the ambient air of substances comprising platinum can be prevented.

The composition according to the invention can be employed in various processes in which platinum or platinum-containing compounds are used. The composition according to the invention is preferably used as catalyst in a process where compounds comprising H—Si groups are reacted with compounds comprising olefinic double bonds. The process is preferably what is known as a hydrosilylation process. Suitable silanes or siloxanes comprising SiH groups are described in "Chemie and Technologie der Silicone", Verlag Chemie, 1960, for example.

It is preferable when the H—Si group-bearing compounds employed in the process according to the invention are
monomeric silanes, for example $R_3SiH$; $R_2SiH_2$; $RSiH_3$;
cyclic silanes, for example $(RHSiO)_4$; $(RHSiO)_3$;
linear or branched oligomeric or polymeric siloxanes such as
$R_3SiO—(R_2SiO—)_a(RSi(H)O—)_bSiR_3$, where a≥0 and b≥1;

$HR_2SiO-(R_2SiO-)_c(RSi(H)O-)_dSiR_2H$, where c and d≥0;

compounds of general formula (III)

where
e=≥0,
f=≥1 and
g=≥1,

R are identical or different groups that do not impede the addition reaction, such as 1 to 8 carbon atom-comprising alkyl groups; substituted 1 to 8 carbon atom-comprising alkyl groups, such as a 3-chloropropyl group, 1-chloromethyl group, 3-cyanopropyl group; aryl groups, such as a phenyl group; aralkyl groups, such as a benzyl group; alkoxy or alkoxyalkyl groups, such as an ethoxy or ethoxypropyl group.

It is preferable when the compounds comprising olefinic double bonds employed in the process according to the invention are compounds having the formulae $CH_2=CH-CH_2-O-(CH_2-CH_2O-)_x-CH_2-CH(R')O-)_y-(SO)_z-R''$ $CH_2=CH-O-(CH_2-CH_2O-)_x-CH_2-CH(R')O-)_y-R''$ $CH_2=CH-CH_2-R^{IV}$ $CH_2=CH-(O)_{x'}-R^{IV}$ where
x=0 to 100,
x'=0 or 1,
y=0 to 100,
z=0 to 100,
R' is an optionally substituted 1 to 4 carbon atom-comprising alkyl group
R'' is a hydrogen radical or a 1 to 4 carbon atom-comprising alkyl group; the group —C(O)—R''' where R'''=alkyl radical;
the group —$CH_2$—O—R'; an alkylaryl group, such as a benzyl group; the group —C(O)NH—R',
$R^{IV}$ is an optionally substituted hydrocarbon radical comprising from 7 to 47, preferably from 13 to 37, carbon atoms,
SO is the radical $C_6H_5$—CH(—)—$CH_2$—O— (styrene oxide radical).

The use according to the invention preferably comprises adding to the reaction mixture an amount of the composition according to the invention such that the amount of platinum is from 1 to 100 wppm based on the reaction mixture.

The process according to the use according to the invention may be carried out as described in EP 1520870 A1. The process may in particular be carried out under the conditions cited therein.

The processes made accessible by use according to the invention are suitable, for example, for preparing SiC bonded systems which are used in the field of polyurethane foam stabilizers (e.g.: hot-cure flexible foam, rigid foam, cold-cure foam, ester foam, etc.), which are used as release agents (silicone waxes, radiation-curing systems such as silicone acrylates for example, etc.), which are used in coatings additives as antifoams, deaerators, lubricant and leveling additives, in applications of wetting agents, in cosmetic formulations for thickeners, emulsifiers, etc.

The present invention is elucidated in more detail using figures FIG. 1 and FIG. 2, without any intention that the invention be restricted to said figure.

The present invention is elucidated in more detail using the examples which follow, without any intention that the invention be restricted to these embodiments. The percentage SiH conversions reported in the examples are determined indirectly by treating the obtained reaction product with sodium butoxide in n-butanol and determining by volumetric means the amount of hydrogen that can still be cleaved off.

EXAMPLE 1 (INVENTIVE)

Preparation of a cis-diamminedichloroplatinum(II) catalyst preparation in an allyl alcohol-started methyl-end-capped polyether, molecular weight (calculated according to iodine number): 1449 g/mol, 12 wt % ethylene oxide, 88 wt % propylene oxide, statistical structure. 15.36 mg of cis-$PtCl_2(NH_3)_2$ are homogeneously incorporated into 2.0 g of the polyether described here for about 30 seconds at 25° C. using a Xenox 40e microstirrer (from Proxxon) rotating at 20 000 revolutions per minute.

EXAMPLE 2 (INVENTIVE)

In a RC1e reaction calorimeter (Mettler-Toledo), 250 g of a hydrosiloxane having the average formula:

$(CH_3)_3Si-(O-Si(CH_3)_2)_{78}-(O-SiH(CH_3))_{10}-O-Si(CH_3)_3$,

SiH value: 1.52 val/kg, and 748.47 g of an allyl alcohol-started methyl-end-capped polyether having a statistical structure (allyl polyether) having a molar mass of 1459 g/mol (according to iodine number) are heated to 90° C. with stirring and then admixed with 76.80 mg of the cis-$PtCl_2(NH_3)_2$ paste prepared in Example 1 (10 ppm Pt based on total batch). Alongside measurement of the thermal conversion, samples are taken after 2.5, 3.5, 5.5, and 6.5 hours and said samples are weighed into a glass burette and subsequently decomposed by addition of a sodium butoxide solution. The gas-volumetric determination, which accompanies the reaction, of SiH value via the volume of liberated hydrogen gas permits additional conversion monitoring.

EXAMPLE 3 (INVENTIVE)

While maintaining all other parameters cited in Example 2, the reaction mixture consisting of hydrosiloxane and allyl polyether is admixed, at 90° C. with stirring, with the cis-$PtCl_2(NH_3)_2$ allyl polyether preparation prepared in Example 1 (10 ppm Pt based on total batch). Thermal conversion and gas-volumetric conversion are determined as described in Example 2.

EXAMPLE 4 (NON-INVENTIVE)

Similarly to, and while maintaining all other parameters from, Examples 2 and 3, the reactants are heated to 90° C. with stirring in the reaction calorimeter and subsequently admixed with 15.36 mg of pulverulent cis-$PtCl_2(NH_3)_2$.

Thermal conversion and gas-volumetric conversion are determined as described in Example 2.

Figure 1:
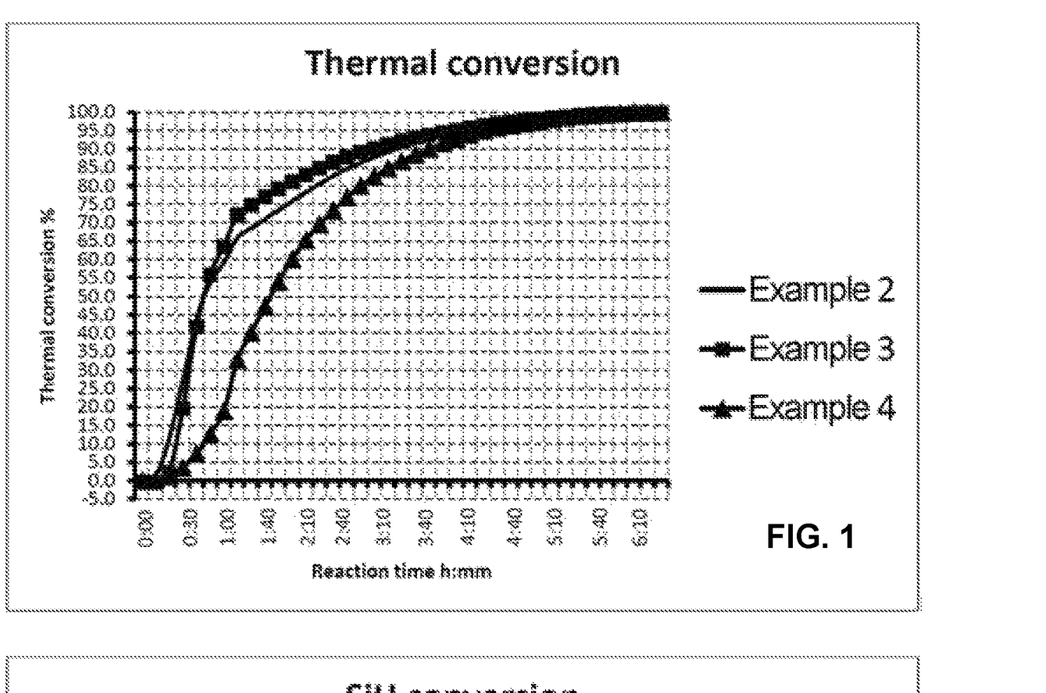
FIG. 1 is a graph for Examples 2 to 4 which shows a plot of thermal conversion against reaction time.

FIG. 1 summarizes the thermal conversions measured by the reaction calorimeter in Examples 2, 3 and 4, normalized to 100%, as a function of reaction time. The conversion curves for the reaction batches catalysed with the inventive cis-PtCl$_2$(NH$_3$)$_2$-polyether preparations (Examples 2 and 3) show a steeper curve in the initial phase of the reaction than the conversion curve characterizing the non-inventive use of the pulverulent cis-PtCl$_2$(NH$_3$)$_2$ complex and thus denote a spontaneous exotherm.

Figure 2:
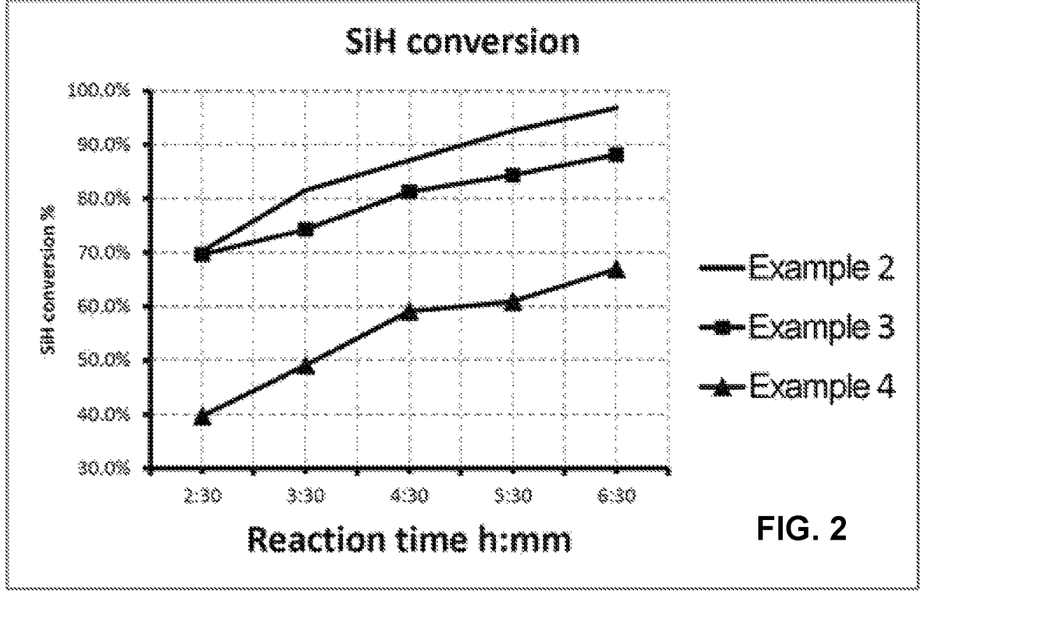
FIG. 2 is a graph for Examples 2 to 4 which shows a plot of SiH conversion against reaction time.

The shapes of the gas-volumetrically determined SiH conversion curves in FIG. 2 (Examples 2 and 3) likewise underscore the enhanced catalytic activity of the inventive polyether preparations of cis-PtCl$_2$(NH$_3$)$_2$ compared to cis-PtCl$_2$(NH$_3$)$_2$ employed in pulverulent form.

EXAMPLE 5 (INVENTIVE)

Preparation of a cis-diamminedichloroplatinum(II) catalyst preparation in a mixture consisting of an ally alcohol-started polyetherol and a butanol-started polyetherol whose mixed molecular weight (calculated according to OH number) is 2018 g/mol and which comprises 90 wt % of ethylene oxide and 10 wt % of propylene oxide in a statistical structure and whose olefinic unsaturation content according to high-resolution $^1$H NMR spectroscopy is 0.04 mol % allyl, corresponding to 0.004 meq/g.

The preparation was prepared using a Getzmann Dispermat dissolver provided with a dispersing disc of 2 cm in diameter, said dissolver rotating at a rotational speed of 5500 revolutions per minute. 12 g of the polyether described hereinabove were initially charged at a temperature in the range of from 40° C. to 50° C. under the above dispersing conditions and 3.0 g of cis-PtCl$_2$(NH$_3$)$_2$ were added. The resulting mixture was dispersed for a total of 15 minutes and the mass was then allowed to cool down with additional manual stirring using a spatula. A very evenly yellow-coloured homogeneous paste was obtained.

EXAMPLE 6 (INVENTIVE)

Preparation of a flexible polyurethane foam stabilizer using the cis-PtCl$_2$(NH$_3$)$_2$ polyether preparation prepared in Example 5.

A 500 ml 4-necked flask equipped with a stirrer, thermometer and reflux condenser is initially charged, at 25° C. and with stirring, with a reaction mixture having the following composition:

198 g of a mixture of different ally polyethers having molecular weights of from 600 g/mol to 3800 g/mol and PO proportions of from 0 to 88 wt % based on the respective polyethers where the (weight-)average formula of the polyether mixture is

CH$_2$=CH—CH$_2$O—(C$_2$H$_4$O)$_{16}$—(C$_3$H$_6$O)$_{19}$—R, where R=89 mol % Me and 11 mol % H, and 60 g of a siloxane having the average formula:

(CH$_3$)$_3$SiO—[(CH$_3$)$_3$SiO—]$_{60.5}$—
[(CH$_3$)HSiO—]$_{6.5}$—Si(CH$_3$)$_3$ (SiH value: 1.263 val/kg).

The reaction matrix consisting of polyethers and hydrosiloxane is initially biphasic and cloudy.

The reaction mixture is heated to 90° C. and then admixed with 20 mg of the inventive catalyst preparation prepared in Example 5 (10 ppm Pt based on total batch). According to gas-volumetric SiH determination (decomposition of an aliquot sample using sodium butoxide in a gas burette), quantitative conversion is achieved after about 2.5 hours. The clear and slightly yellow-coloured polyether siloxane has a viscosity of 1424 mPas. The viscosity was determined on a Haake Viscotester VT550 at 25.00° C. using a Rotor NV measuring spindle. This instrument is a Searle rotational viscometer in which the flow resistance of the test substance is measured at a predefined rotational speed. The torque, rotational speed and geometry of the measuring device are used to calculate viscosity, shear stress and shear rate.

The performance testing of the foam stabilizer thus prepared is carried out with a foam formulation in the following way:

300 parts of a commercially available polyether for preparing flexible polyurethane, an average molecule of which comprises three hydroxyl groups and has a moleular weight of 3500, is in each case mixed with 15 parts of water, 15 parts of a customary physical blowing agent, the appropriate amount of the foam stabilizer to be analysed, 0.33 parts of diethylenetriamine and 0.69 parts of tin octoate with vigorous stirring. Addition of 189 parts of toluene diisocyanate (mixture of 2,4 and 2,6 isomers in a 4:1 ratio) is followed by stirring for 7 seconds at 2500 rpm with a Glatt stirrer and pouring of the mixture into an open-topped box. This affords a fine-pored foam which is characterized by the following parameters:

1. the degree to which the foam settles at the end of the rise phase (known as "collapse"),
2. the number of cells per centimetre of foam, determined by microscopy.

The measured collapse values for 2 different concentrations (1.8 parts/1.5 parts) are reported below:
Collapse: 1.0/1.5 in cm
Porosity: 11/8
Density: 17.95/18.05 kg/m$^3$
Number of cells per centimetre: 13/13

EXAMPLE 7 (NON-INVENTIVE)

Preparation of a Rigid Polyurethane Foam Stabilizer

A 500 ml 4-necked flask equipped with a stirrer, thermometer and reflux condenser is initially charged, at 25° C. and with stirring, with a reaction mixture having the following composition:

161.3 g of a polyether A having the average formula:
CH$_2$=CH—CH$_2$O—(C$_2$H$_4$O)$_{13.5}$—(C$_3$H$_6$O)$_{3.6}$—H (molecular mass according to iodine number: 824 g/mol) and 60 g of a hydrosiloxane having the general formula:

(CH$_3$)$_3$Si—(O—Si(CH$_3$))$_{20.5}$—(O—SiH(CH$_3$))$_5$—
O—Si(CH$_3$)$_3$, SiH value 2.51 val/kg.

This reaction matrix is rapidly heated to 70° C. and 1.6 mg of solid di-μ-chlorobis[chloro(cyclohexene)platinum(II)] (Pt 92), corresponding to 4 ppm Pt based on the reaction batch, are added at 50° C. The reaction batch is held at 70° C. for two hours and the reaction temperature is subsequently elevated to 90° C. Addition of the platinum complex is followed by the appearance of initial black platinum agglomerates pervading through the liquid phase. The gas-volumetrically determined SiH conversion achieved is 80.3% after 3 hours and 99.0% after 4 hours. Once cooled down, a very cloudy polyethersiloxane interspersed with black flocular platinum precipitate is obtained.

EXAMPLE 8 (INVENTIVE)

Preparation of a Rigid Polyurethane Foam Stabilizer

A 500 ml 4-necked flask equipped with a stirrer, thermometer and reflux condenser is initially charged, at 25° C. and with stirring, with a reaction mixture having the following composition:

161.3 g of a polyether A having the average formula: $CH_2=CH-CH_2O-(C_2H_4O)_{13.5}-(C_3H_6O)_{3.6}-H$ (molecular mass according to iodine number: 824 g/mol) and 60 g of a hydrosiloxane having the general formula:

$(CH_3)_3Si-(O-Si(CH_3)_2)_{20.5}-(O-SiH(CH_3))_5-$
$O-Si(CH_3)_3$, SiH value: 2.51 val/kg.

This reaction matrix is rapidly heated to 70° C. and 0.161 mg of a previously prepared 1 wt % solution of di-μ-chlorobis[chloro(cyclohexene)platinum(II)] (Pt 92 dissolved in polyether A) solution, corresponding to 4 ppm Pt based on the reaction batch, are added at 50° C. After 2 hours at 70° C. and a further hour at a reaction temperature of 90° C., the gas-volumetrically determined SiH conversion achieved is quantitative (100%). Once cooled down, a colourless, clear polyethersiloxane showing no trace of platinum precipitate is obtained.

EXAMPLE 9 (STORAGE STABILITY TESTING)

The experiment according to Example 2 was repeated using as catalyst a catalyst according to Example 5 which, however, had first been stored at 22° C. for 3 months. The result of this experiment is reported in Table 1.

TABLE 1

Hydrosilylation results as gas-volumetric SiH conversion in mol %

| SiH conversion after | Example 2 inventive | Example 9 inventive | Example 4 non-inventive |
|---|---|---|---|
| 2.5 h | 70.2% | 70.7% | 39.7% |
| 3.5 h | 81.6% | 75.1% | 49.1% |
| 4.5 h | 87.1% | 81.3% | 59.1% |
| 5.5 h | 92.6% | 86.4% | 60.9% |
| 6.5 h | 96.8% | 90.5% | 66.9% |
| Clearing point | 57 min | 46 min | 200 min |

Clearing Point

Introducing the composition according to the invention into a hydrosilylation system consisting of addition-capable unsaturated polyethers and a siloxane bearing SiH groups leads to the formation of a silicone polyether which acts as a surfactant and thus influences the further course of the reaction. All solvent-free hydrosilylations targeting the SiC bond forming reaction between SiH siloxanes and unsaturated polyethers are initially biphasic due to the incompatibility of SiH siloxane and polyethers. The increase in product concentration over the course of the reaction is accompanied by a decrease in the concentration of incompatible reactants, the silicone polyether copolymer simultaneously acting as a surfactant which, at the phase interface, promotes the dispersal of remaining incompatible reactant droplets, specifically of SiH siloxanes and also of partially reacted SiH siloxanes, in the polyether matrix. The clearing point observable in the SiC bond forming preparation of silicone polyethers is an indicator and consequence of this increasing phase dispersal occurring in the reaction system. At the clearing point, the diameter of the individual droplets of the incompatible dispersed phase has fallen below the wavelength of visible light and the previously cloudy reaction matrix appears to the naked eye to be a single clear phase.

As is apparent from Table 1, the best conversions are achieved when the catalyst is employed in the form of the composition according to the invention. Even storage at room temperature for 3 months (Example 9) shows no significant effect on catalyst activity.

EXAMPLE 10 (INVENTIVE)

Pilot plant preparation of a coatings additive

In a 120 l pilot plant reactor, 50.00 kg of an α,ω-dihydropolydimethylsiloxane having an average total chain length N=30 and a SiH content of 0.87 val/kg are heated to 80° C. with $N_2$ inertization and stirring. 973.8 mg of solid di-μ-chlorobis[chloro(cyclohexene)platinum(II)] (Pt 92) (corresponding to 10 ppm Pt based on the total batch) are initially stirred into 60.6 g of vinyl 4-hydroxybutyl ether and this Pt composition is then added, along with 553.1 g of $Na_2CO_3$, to the siloxane initially charged with stirring. 5 minutes after this addition, 5.246 kg of vinyl 4-hydroxybutyl ether are added dropwise over 20 minutes and the incipient SiC bond forming reaction causes the temperature of the reaction mixture to rise to 98° C.

After 2.5 hours of total reaction time, the gas-volumetrically determined SiH conversion achieved is 99.4%. 1.125 kg of volatiles are removed by distillation at 140° C. with application of an auxiliary vacuum of 22 mbar, the bottoms, once cooled down, are admixed with 55.3 g of butylethanolamine and 0.5% of bentonite and stirred for a further 30 minutes before being filtered through a K 300 filter sheet. This affords a clear, virtually colourless product having a viscosity of 82.1 mPas at 25° C.

The invention claimed is:

1. A composition comprising elemental platinum or platinum(II)-containing compound, wherein said platinum(II) has a positive oxidation state, and an organic compound is vinyl 4-hydroxy butyl ether wherein said composition comprises from 50.0 to 99.9 wt % of the organic compound and from 0.1 to 50.0 wt % of elemental platinum or platinum(II)-containing compound in each case based on the composition, wherein the organic compound and elemental platinum or platinum(II)-containing compound sum to at least 90 wt % based on the composition, wherein the organic compound have an olefinic unsaturation content of at least 0.1 g of iodine/100 g of the organic compound, corresponding to at least 0.004 meq/g, and wherein the platinum(II)-containing compound comprises from more than 95 mol % of cis-$(NH_3)_2PtCl_2$.

2. The composition according to claim 1, wherein the composition comprises at least one platinum(II) compound, wherein the platinum(II)-containing compound comprises from more than 99.5 mol % of cis-$(NH_3)_2PtCl_2$, and the composition comprises no detectable amounts of elemental platinum or platinum (0) compounds.

3. The composition according to claim 1, wherein the platinum(II)-containing compound comprises more than 99.5 mol % of cis-$(NH_3)_2PtCl_2$ as platinum(II)-containing compound, and the organic compound and elemental platinum or platinum(II)-containing compound sum to at least 99 wt % based on the composition.

4. The composition according to claim 1, wherein the composition comprises di-μ-chlorobis(1,2-n)cyclohexene platinum(II) chloride as platinum(II)-containing compound.

5. The composition according to claim 1, wherein the elemental platinum or platinum(II)-containing compounds is from 0.3 to 1 wt % based on the composition.

6. A process for preparing a composition according to claim 1, wherein the elemental platinum or the platinum(II)-containing compound are washed into the vessel with the vinyl 4-hydroxy butyl ether.

7. The process according to claim 6, wherein the addition of the elemental platinum or the platinum(II)-containing compound is effected at a temperature in the vessel of from 30° C. to 75° C.

8. The process according to claim 6, wherein the vessel employed is a spherical vessel fitted with a lateral port by means of which the elemental platinum(II) or the platinum (II)-containing compound are added.

9. The process according to claim 6, wherein the vessel comprises a lateral port with a rotatable connection with which a container containing the elemental platinum(II) or the platinum(II)-containing compound can be connected and, for emptying, rotated such that the contents can feed into the vessel under gravity.

* * * * *